United States Patent [19]

Kubo

[11] Patent Number: 4,540,132

[45] Date of Patent: Sep. 10, 1985

[54] APPARATUS FOR WINDING VIDEO TAPE ON REELS OF A CASSETTE

[75] Inventor: Yoshiharu Kubo, Tokushima, Japan

[73] Assignee: AWA Engineering Co., Ltd., Tokushima, Japan

[21] Appl. No.: 622,059

[22] Filed: Jun. 15, 1984

Related U.S. Application Data

[63] Continuation-in-part of Ser. No. 450,545, Dec. 16, 1982, abandoned.

[30] Foreign Application Priority Data

Dec. 16, 1981 [JP]  Japan .................................. 56-204433

[51] Int. Cl.³ .......................... B23Q 7/00; B65H 19/22
[52] U.S. Cl. ............................. 242/67.1 R; 242/56 A
[58] Field of Search .................. 242/56 R, 56 A, 58.1, 242/58.6, 64; 156/567, 505, 506, 502; 29/773, 785, 819, 820, 792; 414/222, 226, 736, 753

[56] References Cited

U.S. PATENT DOCUMENTS 2,218,352 10/1940 Fischer .................................. 242/64
3,635,415 1/1972 Phelps et al. ...................... 242/54 R
4,114,252 9/1978 Kon et al. ............................. 242/64

Primary Examiner—Stuart S. Levy
Assistant Examiner—Lynn M. Sohacki
Attorney, Agent, or Firm—Wenderoth, Lind & Ponack

[57] ABSTRACT

An apparatus for feeding pairs of reels to a winding position in a winding apparatus for winding video tape on the reels and removing the loaded reels from the winding apparatus. A feeding conveyor feeds trays containing a pair of empty reels removably mounted in the trays to a transfer position and carries trays into which pairs of loaded reels have been placed away from the transfer position. A rotating arm carries holding members at the ends thereof for gripping a pair of reels in a tray at the transfer position and gripping another pair of reels on the winding apparatus at the winding position. Movement of the arm along the axis of rotation removes the reels from the tray and the reels from the winding position, and rotation of the arm switches the reels from the tray to the winding position and vice versa. Thereafter the arm is moved axially to load the empty reels onto the winding machine and the full reels onto the tray.

4 Claims, 18 Drawing Figures

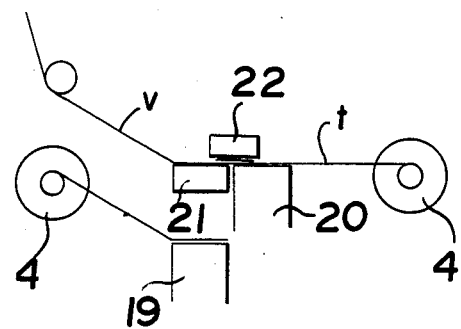
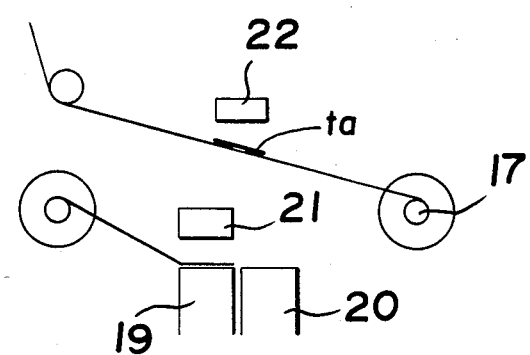
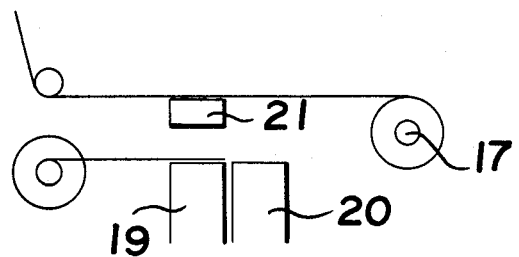

APPARATUS FOR WINDING VIDEO TAPE ON REELS OF A CASSETTE

This application is a continuation-in-part of Ser. No. 450,545, filed Dec. 16, 1982, now abandoned.

BACKGROUND OF THE INVENTION

The present invention relates to an apparatus for winding video tape on reels of a cassette.

An apparatus for winding a long video tape on reels of a video tape cassette and cutting a given length of the tape has been already in practical use. However, in a conventional apparatus of this kind, although the tape is automatically wound and cut, reels are not automatically mounted on the winding apparatus but are mounted manually one by one. Therefore, this winding step requires manual labor.

Since video tape cassettes are produced and sold on a large scale, it is very important that the winding step is carried out with a high efficiency and with a smaller number of workers.

Instead of using human hands, reels can be mounted on and removed from the winding apparatus by robots the movement of which is controlled by means of micro-computers. However, a machine using robots for mounting and demounting reels is very complicated and expensive. Further, by using such a machine, it is difficult to simultaneously remove reels with tape wound thereon and mount empty reels. Therefore, much time is required for mounting and removing reels, and the efficiency, i.e. the work per unit time, is low.

The present invention has been developed for the purpose of eliminating the above-described disadvantages. An important object of the present invention is to provide an apparatus for winding video tape on reels of a cassette which can simultaneously remove reels already having video tape wound thereon and feed empty reels thus improving the efficiency of the work, and which apparatus has a simple mechanism and can be easily operated and manufactured at a low cost.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF SUMMARY OF THE INVENTION

Examples of the present invention will be described below with reference to the appended drawings, in which:

FIGS. 4 to 17 are schematic sectional views showing the process of winding video tape on the reels;

FIG. 18 is a schematic front view of another example of the apparatus for winding video tape on reels of a cassette according to the present invention.

DETAILED DESCRIPTION OF THE INVENTION

Figure 1:
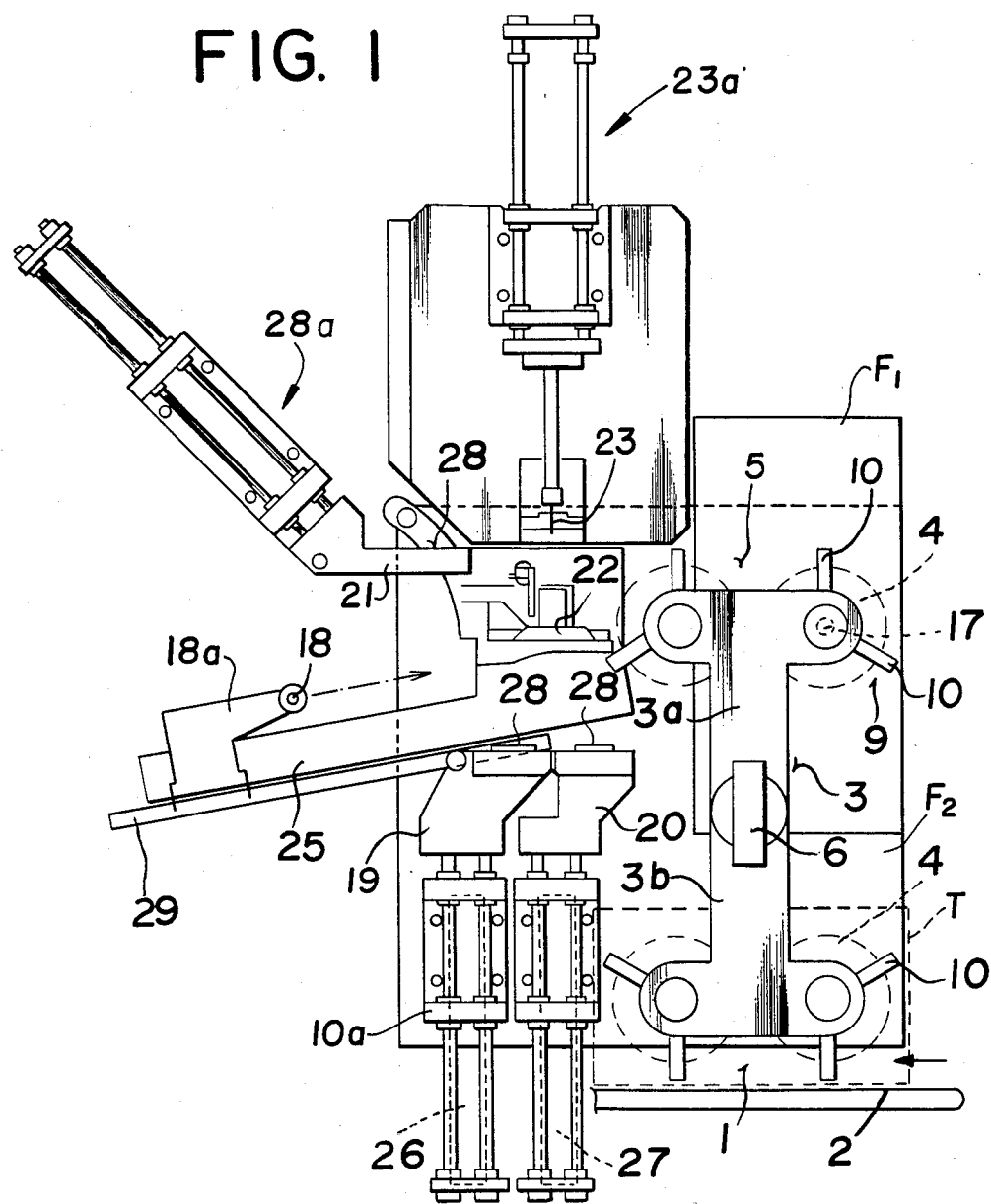
FIGS. 1 and 2 are a front view and a partial side view of an example of an apparatus for winding video tape on reels of a cassette according to the present invention.
Figure 2:
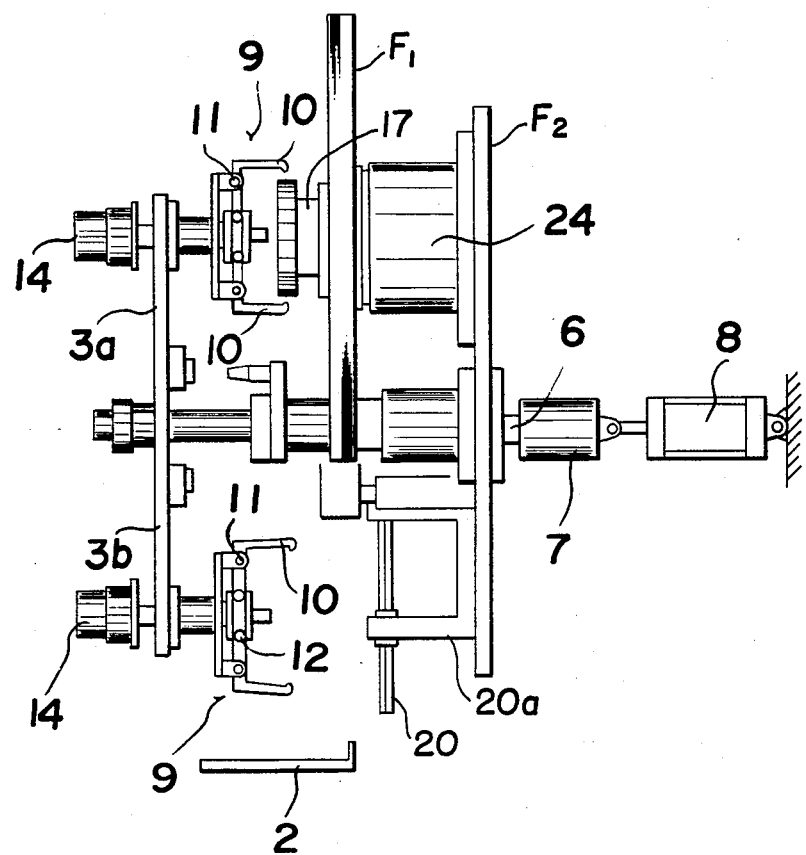

The apparatus for winding video tape on reels of a cassette shown FIGS. 1 and 2 is comprised of a transfer means which has a feeding means and a rotating arm means, and a winding means.

The feeding means is a conveyor 2 which carries a tray T on which reels 4 are removably mounted to a transfer area, here a single transfer position 1, which is both a loading and unloading position, and away from said position, the tray being carried while in the upright state.

The rotating arm means comprises a rotating arm 3 rotatably mounted around the axis of a shaft 6 equally spaced from the transfer position 1 and a winding position 5, and a shaft 6 on which arm 3 is mounted for rotation in the plane including the transfer position 1 and the winding position 5 i.e. in a vertical plane in FIGS. 1 and 2. With this construction, when the rotating arm 3 rotates through 180 degrees, the reels 4 in the transfer position 1 are transferred to the winding position 5 and the reels 4 in the winding position 5 are transferred to the transfer position 1.

The shaft 6 of the rotating arm 3 is connected to a motor-reduction gear means 7 for rotating the shaft in increments at a pitch of 180 degrees. The shaft 6 is reciprocally axially displacable in frame members $F_1$ and $F_2$ by a piston-cylinder device 8 so as to remove reels held by holding members 9 on the arm 3 from the winding means, described hereinafter, and the tray T and then after the arm 3 is rotated, to remount the reels on the winding means and the tray.

The arm 3 has arm portions 3a and 3b extending radially from the shaft 6. The arm portions 3a and 3b are equal in length and have a pair of holding members 9 at the respective outer ends thereof.

Figure 3:
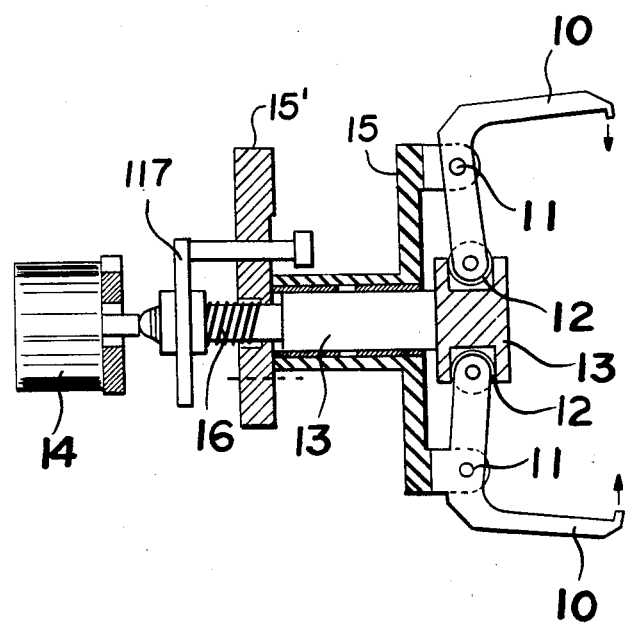
FIG. 3 is an enlarged sectional view of a reel holding used in the apparatus of FIGS. 1 and 2.

Each holding member 9 comprises, as shown in FIG. 3, a plurality of clamping arms 10 spaced around the axis thereof which clamp the reel 4 from at least three directions. The clamping arms 10 are each L shaped and rotatably mounted on a pin 11 adjacent the bent portion on a support 15, and are each provided with a roller 12 at the end near the axis of the holding member.

Each roller 12 is positioned in a groove provided in the end of a reciprocating shaft 13 which is movable along the axis of the holding member by a piston-cylinder device 14 against the action of a spring 16 and guided by guide rod 117 slideable through an opening in support portion 15'. When the reciprocating shaft 13 is pushed rightwardly in FIG. 3, the clamping arms 10 are opened, and upon retraction of the piston-cylinder device, the reciprocating shaft 13 is pushed leftwardly by the coil spring 16. Thus the clamping arms 10 grasp and release a reel.

The winding means is used for winding a given length of tape on each of a pair of reels 4 transferred to the winding position 5. The winding means comprises two shafts, a fixed shaft 17 on frame $F_1$ and a movable shaft 18, vertically movable supports 19 and 20 which are connecting members, a magnetic tape table 21, a tape table 22 and a cutter 23, the operation of which is shown in FIGS. 4 to 17.

The fixed shaft 17 is positioned at the location of the rotational axis of a reel 4 carried on the rotating arm 3 when it is on the righthand side of the winding position 5, and shaft 17 is rotated by a motor 24 mounted on frame $F_2$ and winds a given length of video tape on the reel 4 mounted on the fixed shaft 17 by the action of the rotating arm means and a holding member 9.

The movable shaft 18 is mounted in a shaft holder 18a which in turn is slideably mounted on a guide 25 so as to be movable toward and away from a position spaced laterally to the left of the fixed shaft 17 in FIG. 1 a distance equal to the spacing between a pair of reels on the arm 3, and the holder 18a is connected to a piston-cylinder device 29 for being displaced along guide 25 thereby.

The vertically movable supports 19 and 20 are mounted on the piston rods of piston-cylinder devices 26 and 27 mounted on brackets 19a and 20a in frame $F_2$ so that they are independently movable across the path of the shaft 18. On the upper end surfaces of the vertically movable supports 19 and 20 are air suction ports 28 constituting means for holding the video tape thereagainst by suction.

In the upper surface of the magnetic tape table 21 is provided an air suction port constituting means for holding video tape thereagainst by suction. The magnetic tape table 21 is disposed above the lefthand vertically movable support 19 and along a diagonal line downwardly to the right and upwardly to the left by a piston-cylinder means 28a.

The adhesive tape table 22 is disposed above the space between the two vertically movable supports 19 and 20 and is movable in the vertical direction. The adhesive tape table 22 comprises means for attaching an adhesive tape to the upper surface of the tape held on the vertically movable supports 19 and 20.

The cutter 23 is positioned above the movable supports 19 and 20 in a position to cut the tape held by the vertically movable supports 19 and 20 at the point between the two vertically movable supports 19 and 20. For this purpose, the cutter 23 is provided just above the space between the two vertically movable supports 19 and 20 and is movable in the vertical direction by piston-cylinder means 23a.

The operation of the apparatus for winding tape on reels comprises a repetition of the following steps.

Figure 4:
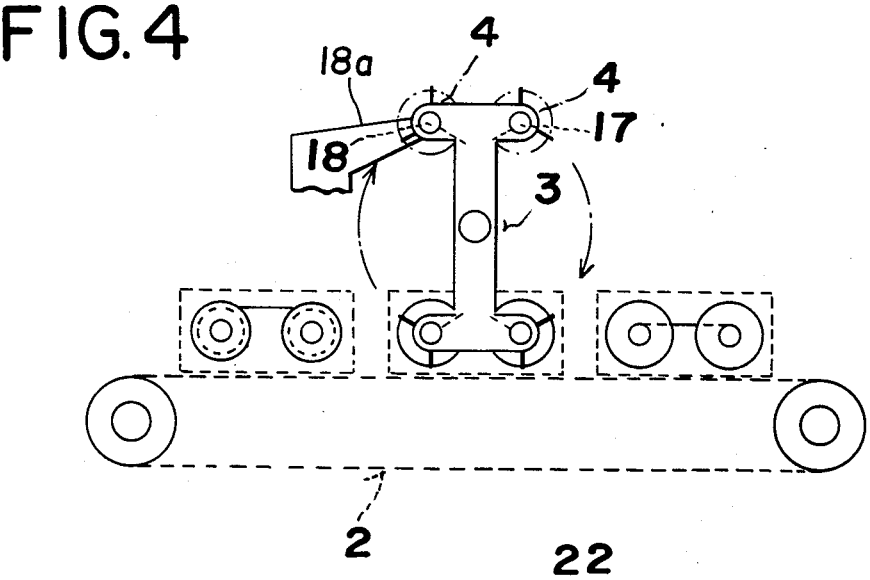

(1) As shown in FIG. 4, with the holder 18a moved to the rightmost position in FIG. 1 to position movable shaft 18 in the position spaced laterally to the left of fixed shaft 17, as described above, two reels in a set are mounted on the fixed shaft 17 and the movable shaft 18 respectively by means of holding members 9 on rotating arm 3, the arm rotating into the FIG. 4 position with the holding members 9 carrying reels 4 from a tray T and then moving toward the shafts 17 and 18 by the piston-cylinder device 8 to place the reels on the shafts after which the holding members are operated to release the reels and the arm 3 is moved back away from shafts 17 and 18.

Figure 5:
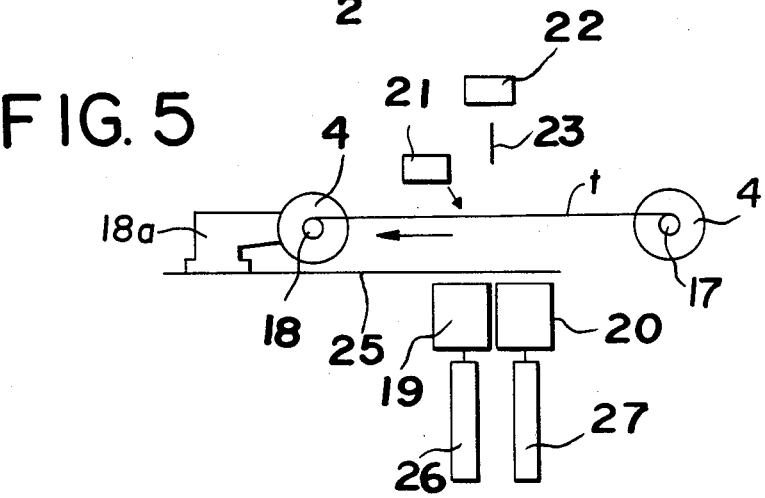

(2) Then, as shown in FIG. 5, the movable shaft 18 is displaced leftwardly along the guide 25 and unwinding a short tape t previously wound on the reels 4, as is conventional.

At this time, the vertically movable supports 19 and 20 are in the lower position and the magnetic tape table 21, cutter 23 and the adhesive tape table 22 are in the upper positions.

Figure 6:
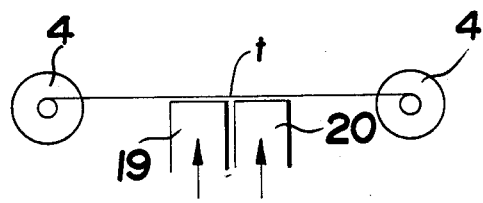

(3) As shown in FIG. 6, the two vertically movable supports 19 and 20 are moved upwardly to contact the short tape t and hold the tape by suction.

Figure 7:
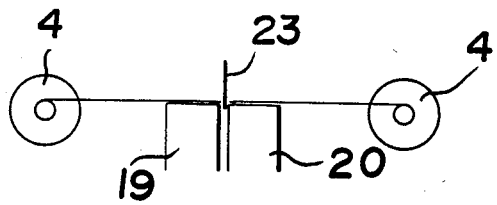

(4) While the tape t is thus held, as shown in FIG. 7, the cutter 23 is moved down and cuts the tape at the point between the two vertically movable supports 19 and 20 and then moves back up.

Figure 8:
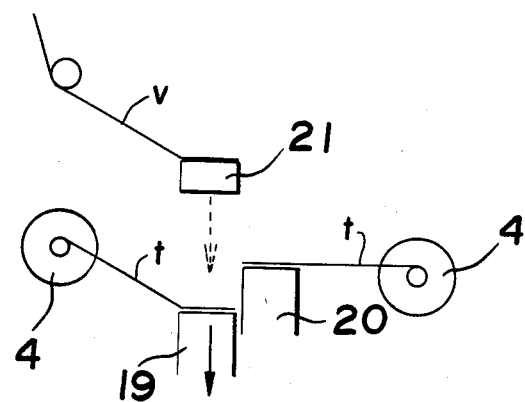
Figure 9:
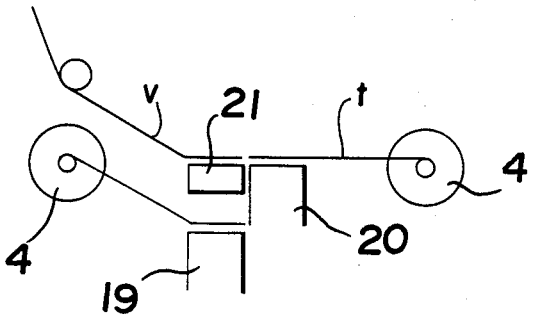

(5) Next, as shown in FIGS. 8 and 9, only the lefthand vertically movable support 19 is moved down, and the magnetic tape table 21 with the end of the video tape v to be wound onto the reels held on the upper surface thereof by suction moves down until the upper surface is in the same plane as the upper surface of the righthand vertically movable support 20.

(6) Next the adhesive tape table 22 is moved down and adheres a piece of adhesive tape ta to the end of the short tape t to the end of the video tape v to connected the video tape v and the short tape t.

(7) The adhesive tape table 22 is then moved up as shown in FIG. 11, and the two vertically movable supports 19 and 20 and the magnetic tape support 21 are moved down so that they are spaced from the tape.

(8) The fixed shaft 17 is rotated to wind the video tape onto the reel 4 on the fixed shaft 17, as shown in FIG. 12.

Figure 13:
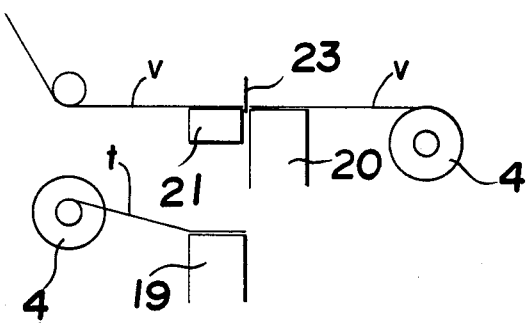

(9) When the desired length of video tape has been wound on the reel mounted on the fixed shaft 17, the fixed shaft 17 is stopped, and as shown in FIG. 13 the magnetic tape table 21 and the righthand vertically movable support 20 are moved up and hold the video tape v by suction. The cutter 23 is again moved down and cuts the video tape.

Figure 14:
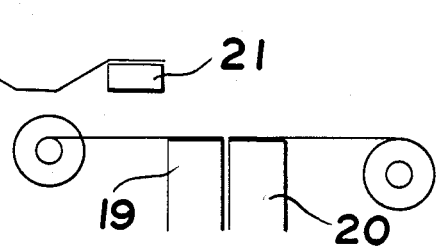

(10) As shown in FIG. 14, the cutter 23 is then moved up, the magnetic tape table 21 is moved up, and the lefthand vertically movable support 20 which has been holding the short tape t is also moved up until it is level with the righthand vertically movable support 20.

Figure 15:
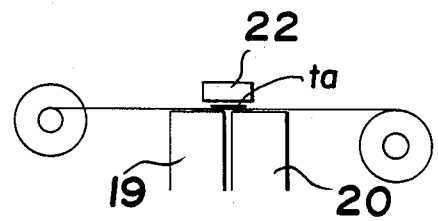

(11) As shown in FIG. 15, the adhesive tape table 22 is again moved down and adheres a piece of adhesive tape ta to the ends of the short tape t and video tape v held by the movable supports for connecting the short tape t to the rear end of the video tape v.

Figures 16, 17, 18:
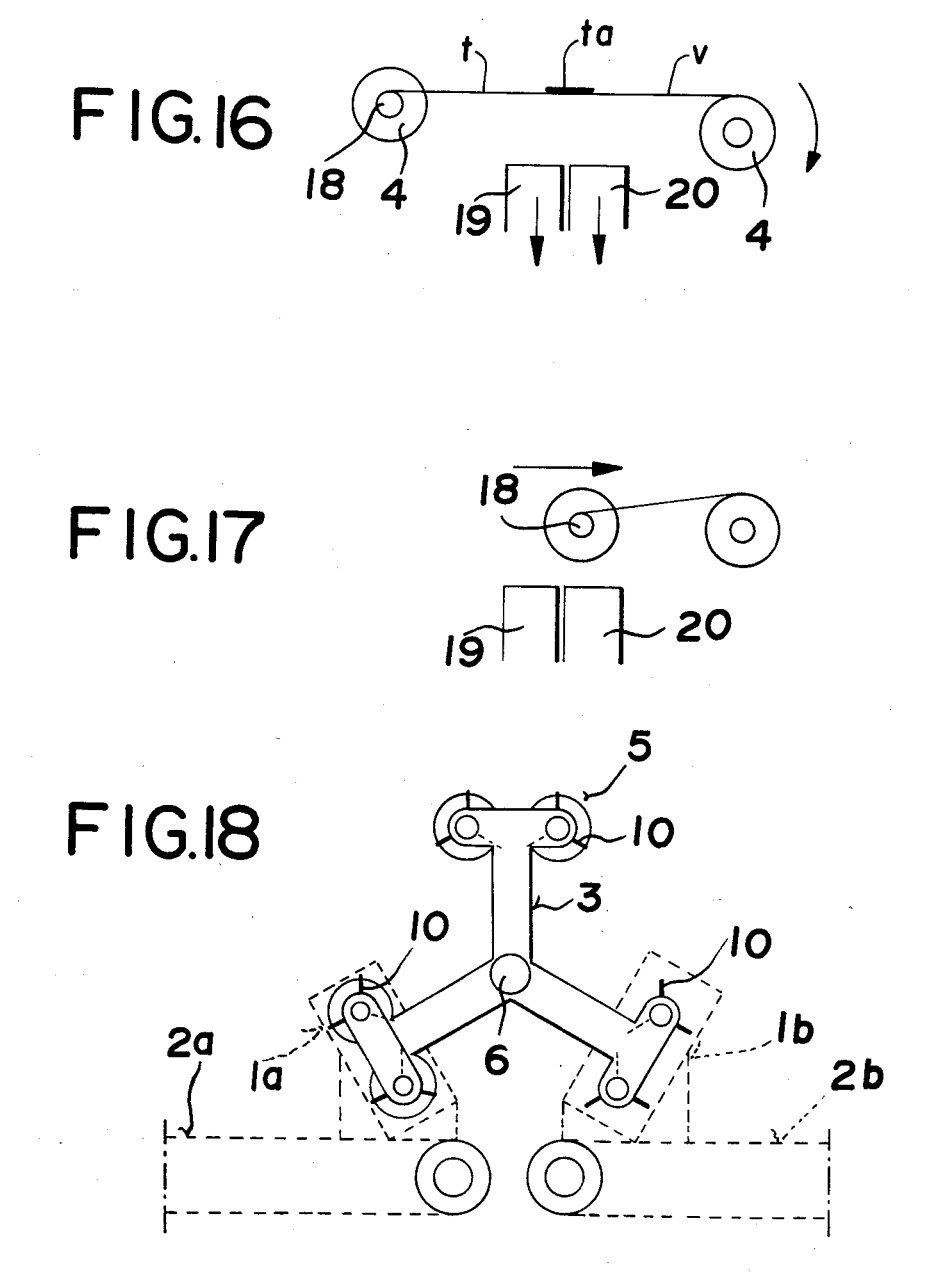

(12) The two vertically movable supports 19 and 20 are then moved down away from the path of movement of the movable shaft 19 as shown in FIG. 16.

(13) Finally, as shown in FIG. 17, the fixed shaft 17 is rotated to wind the tape therearound and the holder 18a is moved along guide 25 to move the movable shaft 18 toward the fixed shaft 17 until the two reels are in position to be clamped by the clamping arms 10 of the holding members 9 on the rotating arm 3. The rotating arm 3 then moves toward the shafts 17 and 18 and the holding members are operated to clamp the reels, and the arm 3 is then moved away from the shafts 17 and 18 carrying the reels on which the tape has been wound. Rotation of arm 3 moves the full reels to the transfer position 1, and also transfers empty reels from the transfer position to the winding position 5.

The operations of items (1) to (13) are repeated to wind the video tape on the empty reels.

The details of the operation of the rotating arm 3 for conveying the reels from the transfer position 1 to the winding position 5 and back are as follows.

(14) A tray on which two reels are mounted is carried by the conveyor 1 in the upright position to the transfer position 1. At this time, as shown in FIGS. 2 and 3, the piston-cylinder device 8 has the piston rod out and the shaft 6 of the rotating arm 3 is displaced leftwardly.

(15) The shaft 6 is displaced rightwardly by the operation of piston-cylinder device 8. At this time, the piston of the piston-cylinder device 14 is out, and the reciprocating shaft 13 is displaced rightwardly and the clamping arms are open.

After the piston rod of the cylinder 8 is retracted, the piston rod of the piston-cylinder device 14 is retracted and the clamping arms 10 are pivoted so as to grip the two reels on the tray.

(16) The piston rod of the piston-cylinder device 8 is pushed out and the shaft 6 is displaced leftwardly. Then, the drive motor-reduction gear means 7 is driven and the shaft 6 is rotated through 180 degrees, whereby the reels are transferred to the winding position.

(17) The piston rod of the piston-cylinder device 8 is retracted and the two reels carried by the holding member 9 are mounted on the fixed shaft 17 and the movable shaft 18.

(18) The piston rod of the piston-cylinder device 14 is pushed out to pivot clamping arms 10 to release the reel. Then, the rod of the piston-cylinder device 8 is pushed out and the shaft 6 is displaced leftward.

The above-described operation is that which is carried out when no reels are in the winding position 5. If reels on which the video tape has been already wound are in the winding position 5 and empty reels are in the transfer position 1, the operation comprises the following steps.

(19) After step 14 as described above, with clamping arms 10 on the holding members on both ends of the rotating arm 3 open, the piston rod of the cylinder is retracted and then the piston rod of the piston-cylinder devices 14 on both ends of the arms is retracted, whereby the clamping arms 10 on the upper end of arm 3 clamp the two reels in the winding position 5, while the clamping arms 10 on the lower end of the arm 3 clamp the two empty reels in the transfer position 1.

(20) The piston rod of piston-cylinder device 8 is pushed out to move the reels in the winding position 5 off the shafts 17 and 18 and the empty reels out of the tray T. Then the shaft is rotated through 180 degrees whereby the empty reels are transferred to the winding position 5 and the reels on which the tape has been wound are transferred to the transfer position 1.

(21) The piston rod of the piston-cylinder device 8 is retracted to mount the empty reels on shaft 17 and 18 and the tape-containing reels in the tray T, and the piston rods of the piston-cylinder devices 14 are pushed out, whereby the clamped reels are released. Then the piston rod of the piston-cylinder device 8 is pushed out to move the arm 3 away from the reels. Thus the reels on which the tape has been wound are transferred to the transfer position and loaded in the trays, and the empty reels are transferred to the winding position and put on shafts 17 and 18.

The operations (19)–(21) are repeated so that the reels are continuously exchanged between the transfer and winding positions.

In the apparatus shown in FIGS. 1 and 2, the position for unloading and the position for loading the trays is the same, i.e. the transfer position, and the rotating arm 3 has two arm portions extending in radially opposite directions. With the rotation of this rotating arm 3 through 180 degrees, the reels are unloaded and loaded.

FIG. 18 shows an example of the present invention in which the transfer area has two positions, an unloading position 1a and loading position 1b, and these positions and the winding position 5 are located around the shaft 6 of the rotating arm 3 so as to be equally spaced from the shaft 6 and at a pitch of 120 degrees.

The rotating arm 3 has three arm portions each of which is provided at the outer end with a holding member 9 having clamping arms 10 for clamping reels. The transfer means is constituted by a feeding conveyor 2a and a discharge conveyor 2b. Mechanisms for rotating the rotating arm 3, for displacing the shaft 6 of the rotating arm 3 and for driving the clamping arms 10 can be the same as those used in the example shown in FIGS. 1 and 3. In this example, however, the rotating arm 3 is rotated at a pitch of 120 degrees.

In the operation of this apparatus, each time the rotating arm 3 is rotated through 120 degrees, the reels in the winding position 5 are transferred to the unloading position 1a and the reels in the loading position 1a are transferred to the winding position 5.

The advantage of this construction is that the loading and unloading of the reels can be separately carried out.

EFFECTS

In the apparatus for winding video tape on reels of a cassette having the above-described construction according to the present invention, by a simple operation i.e. the rotation of the rotating arm, the empty reels and the reels on which the video tape has been wound can be exchanged. Consequently, only a simple mechanism is needed for achieving this operation. In addition, the time required for exchanging the reels can be greatly shortened and the efficiency of the work can be increased. The cost for the equipment is quite low.

What is claimed:

1. An apparatus for feeding pairs of reels to a winding position in a winding apparatus for winding video tape on the reels and removing the loaded reels from the winding apparatus, comprising:
    a feeding means for feeding trays carrying a pair of empty reels removably mounted in the trays to a transfer area, and carrying trays into which pairs of loaded reels have been placed away from the transfer area;
    a rotating arm means rotatably mounted adjacent said feeding means for transferring a pair of reels from a tray at the transfer area to the winding position and another pair of reels having tape wound thereon from the winding position to the transfer area, said rotating arm being rotatable about a point between the transfer area and the winding position and in a plane including the transfer area and the winding position and being movable axially, means for rotating said rotating arm means and reciprocally moving said rotating arm means axially of the axis of said rotation shaft, said rotating arm means having a plurality of arms extending radially from said rotation shaft, each of said arms having on the free end a holding member means for gripping a pair of reels while said rotating arm means is moved axially for removing the reels from a tray, holding the reels while said rotating arm means is rotated and while the reels are placed on the winding apparatus in the winding position as said rotating arm means is moved axially, for gripping reels in the winding position while said rotating arm means is moved axially for removing the reels from the winding apparatus, holding the reels while the rotating arm means rotates and while the reels are placed in the trays as said rotating arm means is moved axially.

2. An apparatus as claimed in claim 1 in which said holding member means comprises clamping arms for clamping the periphery of the reels.

3. An apparatus as claimed in claim 1 in which said transfer area has a single transfer position, and said transfer position and winding position are spaced 180° from each other around said rotation shaft, and said rotating arm means has two arms on diametrically opposite sides of said rotation shaft and aligned with each other for rotation of said rotating arm means through 180° for moving reels between the winding position and the transfer position.

4. An apparatus as claimed in claim 1 in which said transfer area has two transfer positions spaced at 120° from each other around said rotation shaft, and said winding position is spaced 120° from said transfer positions, and said rotating arm means has three arms spaced 120° around said rotation shaft for rotation of said rotating arms through 120° at each rotation for moving reels from the first transfer position to the winding position and moving reels from the winding position to the second transfer position.

* * * * *